United States Patent
Goto et al.

(10) Patent No.: US 6,869,111 B2
(45) Date of Patent: Mar. 22, 2005

(54) LUBRICATING COATING COMPOSITION SUITABLE FOR LUBRICATION OF A THREADED JOINT

(75) Inventors: Kunio Goto, Kobe (JP); Shigeo Nagasaku, Nishinomiya (JP); Hideo Yamamoto, Takarazuka (JP)

(73) Assignees: Sumitomo Metal Industries, Ltd., Osaka (JP); Vallourec Mannesmann Oil & Gas France, Aulnoye-Aymeries (FR)

( * ) Notice: Subject to any disclaimer, the term of this patent is extended or adjusted under 35 U.S.C. 154(b) by 0 days.

(21) Appl. No.: 10/201,932

(22) Filed: Jul. 25, 2002

(65) Prior Publication Data

US 2003/0111838 A1 Jun. 19, 2003

Related U.S. Application Data

(63) Continuation of application No. PCT/JP01/10573, filed on Dec. 4, 2001.

(30) Foreign Application Priority Data

Dec. 4, 2000 (JP) .................................. 2000-368895

(51) Int. Cl.⁷ ................................................ F16L 35/00
(52) U.S. Cl. ........................................ 285/333; 285/94
(58) Field of Search ........................... 285/333, 94, 334

(56) References Cited

U.S. PATENT DOCUMENTS

| | | | | |
|---|---|---|---|---|
| 3,869,393 A | * | 3/1975 | Booker ........................ | 285/94 |
| 4,213,868 A | * | 7/1980 | Bitely et al. .................. | 285/94 |
| 4,527,815 A | * | 7/1985 | Frick .......................... | 285/333 |
| 4,630,849 A | * | 12/1986 | Fukui et al. ................. | 285/333 |
| 4,813,714 A | * | 3/1989 | Fairey et al. ................. | 285/94 |
| 4,893,658 A | * | 1/1990 | Kimura et al. .............. | 285/333 |
| 5,040,827 A | * | 8/1991 | DeLange ..................... | 285/333 |
| 5,566,986 A | * | 10/1996 | Allen et al. ................... | 285/94 |
| 6,027,145 A | * | 2/2000 | Tsuru et al. ................. | 285/333 |

FOREIGN PATENT DOCUMENTS

| | | |
|---|---|---|
| EP | 0 398 505 A1 | 11/1990 |
| EP | 0 786 616 A1 | 7/1997 |
| GB | 1 239 860 (11) | 7/1971 |
| JP | 56-041285 A | 4/1981 |
| JP | 02-229891 A | 9/1990 |
| JP | 05-306397 A | 11/1993 |
| JP | 08-233164 A | 9/1996 |
| JP | 09-072467 A | 3/1997 |
| JP | 11-132370 A | 5/1999 |
| WO | WO 01/16516 A1 | 3/2001 |

* cited by examiner

*Primary Examiner*—David Bochna
(74) *Attorney, Agent, or Firm*—Burns, Doane, Swecker & Mathis, L.L.P.

(57) ABSTRACT

A lubricating coating composition in which at least one basic lubricant selected from a basic sulfonate, a basic salicylate, and a basic phenate is dissolved in a volatile solvent is applied to the frictional surface of a box and a pin constituting a threaded joint for oil well pipes. The composition may further contain one or more of a thermoplastic resin powder, another lubricant, and an extreme pressure agent. The surface roughness of the frictional surfaces preferably has an Rmax in the range of 5–40 micrometers.

17 Claims, 4 Drawing Sheets

LUBRICATING COATING COMPOSITION SUITABLE FOR LUBRICATION OF A THREADED JOINT

This application is a continuation of International Application No. PCT/JP01/10573 filed on Dec. 4, 2001 and claims priority under 35 U.S.C. §§ 119 and/or 365 to 2000-368895 filed in Japan on Dec. 4, 2000, the entire content of which is hereby incorporated by reference.

TECHNICAL FIELD

This invention relates to a lubricating coating composition suitable for lubrication of a threaded joint for metal pipes and particularly oil well pipes, and to a method of lubricating a threaded joint using the composition. The lubricating coating composition according to this invention can impart adequate lubricity and rust preventing properties to a threaded joint for oil well pipes without the need to apply a lubricating grease.

BACKGROUND ART

Oil well pipes such as tubing and casing used in the drilling of oil wells for crude oil and gas oil are typically connected to each other by threaded joints. In the past, the depth of oil wells was typically 2000 to 3000 meters, but more recently, the depth of oil wells may reach 8,000 to 10,000 meters in offshore oil fields and other deep wells.

A threaded joint for oil well pipes is subjected to various forces in its environment of use, including loads such as axial tensile forces caused by the weight of the oil well pipe and the threaded joint, pressures combined by internal and external pressures, and geothermal heat. Therefore, a threaded joint needs to be able to maintain gas tightness without breakage in such severe environments.

During the process of lowering tubing or casing into a well, a joint which is once fastened for connection often needs to be loosened or unfastened and then re-fastened. API (American Petroleum Institute) requires that there be no occurrence of galling, which is unrecoverable seizing, and that gas-tightness be maintained even if fastening (make-up) and unfastening (break-out) are repeated ten times for a tubing joint and three times for a casing joint.

One type of threaded joint for oil well pipes having excellent sealing properties is a threaded joint with a pin-box structure having a metal to metal contact portion forming a seal. In this threaded joint, typically, a pin is formed on the outer surface of each end of an oil well pipe. The pin has an externally threaded portion and a metallic contact portion without threads. The latter portion is hereunder referred to as an "unthreaded metal contact portion" and it is located on the front end of the threaded portion at the tip of the pipe. A box is formed on the inner surface of a separate, sleeve-shaped coupling member, and it has an internally threaded portion and an unthreaded metal contact portion on the rear of the threaded portion which respectively contact or mate with the corresponding threaded and unthreaded portions of the pin. When the pin is screwed into the box for fastening, the unthreaded metal contact portions of the pin and the box are made to tightly contact each other to form a metal seal.

As a matter of principle, a pin may be formed on one end of an oil well pipe and a box may be formed on the opposite end of the oil well pipe so that two oil well pipes can be connected to each other in series without using a separate coupling member. It is also possible to form an internal thread on the inner surface at both ends of an oil well pipe to define boxes, and to form an external thread on each end of a coupling member to define pins.

In order to guarantee adequate sealing properties by the metal seal of the above-described threaded joint in the environment of an oil well pipe, it is necessary to apply an extremely high surface pressure to the unthreaded metal contact portions during fastening. This high pressure makes it easy for galling to take place. Therefore, prior to fastening, a lubricating grease called a compound grease is applied to the metal contact portions and the threads in order to impart an increased resistance to galling and form a seal having improved gas tightness.

However, compound grease contains a large amount of a powder of a heavy metal such as Pb, Zn, or Cu, and when the applied grease is washed off, there is the possibility of its causing environmental pollution. In addition, the application of compound grease worsens the work environment and decreases the operating efficiency. Accordingly, a threaded joint which does not need the application of a lubricating grease such as compound grease is desired.

With respect to a threaded joint which does not use a lubricating grease, Japanese Published Unexamined Patent Applications Nos. 8-233164 (1996) and 9-72467 (1997) disclose a pin-box type threaded joint having a solid lubricant-resin coating formed on the metal contact portion of the box or pin. This coating is based on a solid lubricant and comprises a large amount of a solid lubricant such as molybdenum disulfide dispersed in a resin such as an epoxy resin. Japanese Published Unexamined Patent Application No. 11-132370 (1999) discloses a threaded joint having such a solid lubricant-resin coating in which the taper ratio of the threads is optimized.

However, it is not easy to form a solid lubricant-resin coating to a uniform thickness along the shape of the thread and the unthreaded metal contact portions of a threaded joint. If the coating is not formed with a prescribed uniform thickness, in those areas where the coating is too thick, the surface pressure exerted thereon during fastening of the threaded joint becomes too large, resulting in an increase in the torque required for fastening (make-up torque), or this may lead to deformation of the shape of the threads, and it becomes easy for galling to occur. On the other hand, in areas where the coating is too thin, poor lubrication and rusting tend to occur easily.

In an oil well, connection of oil well pipes to each other is frequently carried out in a state in which an oil well pipe to be connected is stood upright with the pin at one end of the pipe facing into the ground. At the time of fastening, it is not unusual for misalignment to occur in such a manner that the longitudinal axis of the pipe, i.e., the rotational axis during screwing of the pin, horizontally deviates from alignment with the axis of the box in which the pin is inserted, or slopes to the side from the upright position. In addition, when an oil well pipe is stood upright, rust or scale flakes peeled off from the internal surface or blasting particles introduced to remove rust or scale may fall down through the lumen of the pipe and adhere or deposit on the joint. Thus, fastening may take place in the presence of rust or scale flakes or blasting particles adhered on the threaded portion or the unthreaded metal contact portion.

Under conditions involving the above-described problems of misalignment and/or deposited foreign matters which occur frequently during fastening of pipes in an oil well, even if the solid lubricant-resin coating can be formed to a prescribed constant thickness, it is easy for galling to take place. This is because a solid lubricant-resin coating has poor extensibility and fluidity, and it may easily peel off. Under the above-described conditions, an excessive pressure may be applied locally on some areas in the threaded portion and unthreaded metal contact portion, thereby causing the solid lubricant-resin coating to peel off in the excessively pressurized areas. Thus, bare metal surfaces may be exposed in some areas of the joint, leading to the occurrence of galling.

On the other hand, when a greasy or oily lubricant which has inherently good fluidity is applied to a threaded joint, at the time of fastening of the joint, pressure acts on the lubricant confined in the gaps between threads or in valley portions of the surface to cause the pressurized lubricant to seep into the surrounding areas, and as a result the metal contact portions can be successfully lubricated. This effect cannot be expected with a solid lubricant-resin coating which inherently has poor extensibility and fluidity.

A lubricating grease is normally washed of and re-applied prior to each fastening operation. In contrast, a solid lubricant-resin coating is formed prior to the initial fastening operation and should be maintained up to the last fastening operation, so it has a problem with respect to rust prevention as described below.

Figure 1:
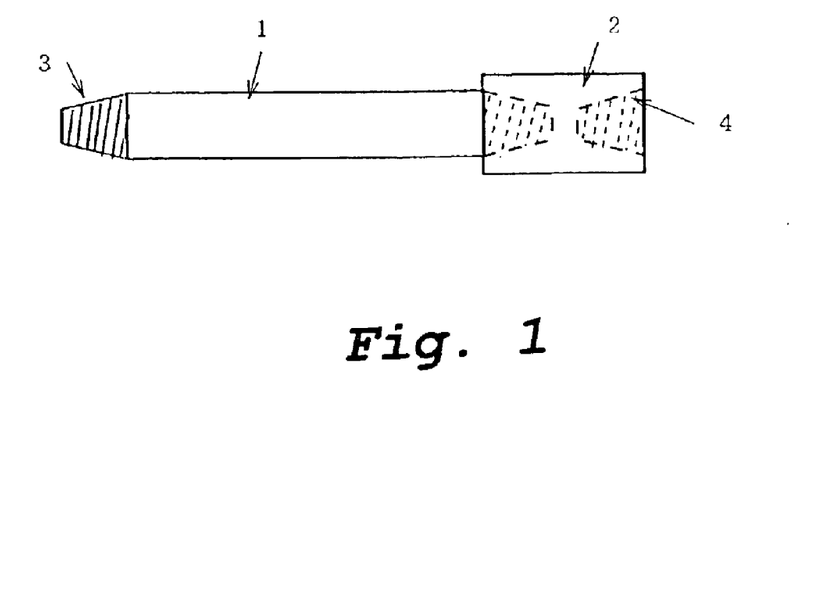
FIG. 1 is a schematic diagram showing the assembled structure of an oil well pipe and a threaded coupling member connected to the pipe at the time of shipment.

FIG. 1 is a schematic diagram showing an oil well pipe 1 having a pin with an externally threaded portion 3 at both of its ends and a threaded coupling member 2 having a box with an internally threaded portion 4 at both of its ends.

The oil well pipe 1 is normally shipped in the state shown in FIG. 1, i.e., in a state in which the coupling member 2 is connected in advance to one end of the oil well pipe 1. Accordingly, the above-described solid lubricant-resin coating must be formed prior to connection of the threaded coupling member 2 to one end of the oil well pipe 1, which is carried out before shipping. The resulting oil well pipe/coupling member assembly has a pin or box at each end which is not connected to a mating box or pin, and such a pin or box is often exposed to rain water during transport or during storage. The solid lubricant-resin coating does not have sufficient rust preventing properties to completely protect the pins and boxes in such situation and rusting can easily occur. If a compound grease is applied prior to shipment partly for the purpose of rust prevention, rusting can be prevented more effectively.

Due to the poor lubricity of rust, and due to swelling or peeling of a solid lubricant-resin coating accompanying the formation of rust, the make-up torque required to fasten a rusted joint becomes even more unstable, thereby causing galling to take place easily and gas tightness to decrease.

DISCLOSURE OF THE INVENTION

An object of the present invention is to provide a composition suitable for forming a lubricating coating, particularly on a threaded joint for oil well pipes, in which the above-described problems of the prior art are at least partly alleviated or eliminated.

Another object of the present invention is to provide a lubricating coating composition which is capable of preventing or alleviating the formation of rust without using a compound grease, thereby improving the stability of make-up torque.

A further object of the present invention is to provide a lubricating coating composition which can provide a threaded joint for oil well pipes which has excellent resistance to galling and which is capable of forming a good gas-tight seal even if fastening of a threaded joint is conducted under conditions such as those in which there is misalignment of pipes or adhesion of rust or scale flakes or blasting particles to the joint, which occurs frequently in actual fastening procedures.

Figure 2:
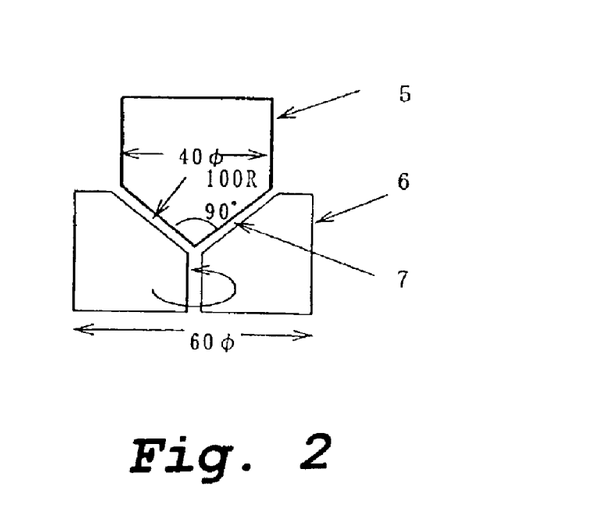
FIG. 2 is a schematic diagram showing a rotating friction tester used to evaluate the lubricity of a lubricating coating composition according to the present invention.

The present inventors studied the resistance to galling of a coating of a semi-solid or viscous fluid (below collectively referred to as a semi-dry material) by measuring its load carrying capacity up to galling using a rotating friction tester as shown in FIG. 2. They also investigated rust preventing properties of the coating using a salt water spray test specified in JIS Z2371. As a result, they made the following discoveries:

[Resistance to Galling]

(1) The load carrying capacity up to the occurrence of galling measured by a rotating friction tester has a good correlation to the ease of occurrence of galling in a repeated make-up and break-out test with an actual pipe.

(2) A basic sulfonate, a basic salicylate, and a basic phenate are all semi-solid or viscous lubricants like a grease at room temperature. They exhibit fluidity under hydrostatic pressure and can provide excellent resistance to galling even when in the form of a relatively thin coating.

(3) When any one of these lubricants is at least partly dissolved in a solvent and the resulting solution is applied to a threaded joint to form a thin coating, the lubricant has a decreased stickiness, thereby decreasing adhesion of foreign matter to the coating and improving resistance to galling.

(4) Addition of a thermoplastic resin to the lubricant results in an even lower stickiness of the lubricant and serves to increase the viscosity, whereby the resistance to galling is further increased.

(5) The greater the surface roughness of the substrate on which the lubricant is applied, the greater the increase in resistance to galling.

[Rust Prevention]

(1) A basic sulfonate, salicylate, or phenate has better rust preventing properties than a neutral one.

(2) When these lubricants are diluted with a solvent before application, they are adsorbed by the substrate more uniformly, and good rust preventing properties can be obtained even with a thin coating.

In one aspect, the present invention provides a lubricating coating composition, comprising a volatile organic solvent, and at least one basic lubricant selected from the group consisting of a basic sulfonate, a basic salicylate, and a basic phenate which is at least partially dissolved in the solvent.

In another aspect, the present invention is a threaded joint for metal pipes comprising a pin and a box capable of mating with each other, the pin having an externally threaded portion and an unthreaded metal contact portion, and the box having an internally threaded portion and an unthreaded metal contact portion, wherein at least one of the pin and the box has a lubricating coating formed on the threaded portion and/or unthreaded metal contact portion, the lubricating coating comprising at least 10 wt % of at least one basic lubricant selected from the group consisting of a basic sulfonate, a basic salicylate, and a basic phenate. The threaded joint can be made up without application of a grease lubricating agent.

In a preferred embodiment, the lubricating coating composition or the lubricating coating further comprises a thermoplastic resin, and the thermoplastic resin is preferably in the form of a powder which is insoluble in the solvent. In another preferred embodiment, the composition or coating further comprises at least one additive selected from a lubricant other than the basic lubricant and an extreme pressure agent.

The present invention also relates to a method of lubricating a threaded joint for metal pipes in which the above-described lubricating coating composition is applied to at least part of the threaded portion and unthreaded metal contact portion of at least one of the pin and the box of the threaded joint and is dried to evaporate the solvent and form a semi-dry lubricating coating.

Japanese Published Unexamined Patent Application No. 2-229891 (1990) discloses a lubricating oil composition including at least one of a basic sulfonate, a basic salicylate, and a basic phenate. However, as will be explained below, that lubricating oil composition is essentially different from the lubricating coating composition according to the present invention.

The lubricating oil composition disclosed in Japanese Published Unexamined Patent Application No. 2-229891 comprises at least one basic lubricant selected from a basic sulfonate, a basic salicylate, and a basic phenate along with an amine additive in a base oil of the lubricating oil. Since the base oil is not volatile, the composition forms an oil coating, when applied, in which the base oil remains without evaporating.

On the contrary, in the lubricating coating composition according to the present invention, the basic lubricant selected from a basic sulfonate, a basic salicylate, and a basic phenate is at least partially dissolved in a volatile solvent. Since the solvent vaporizes during drying after application, it does not essentially remain in the lubricating coating. Thus, the action of the base oil used in the above-described Japanese published application and the volatile solvent used in the present invention are fundamentally different.

Furthermore, when the lubricating coating composition of the present invention is applied to a threaded joint for oil well pipes, it forms a lubricating coating which continues to exhibit a lubricating function even when make-up and break-out are repeated. This lubricating coating contains at least 10 wt % of the basic lubricant as a main lubricant, and even when it does not include another lubricant such as a base oil, it can exhibit a lubricating effect.

In contrast, the lubricating oil composition described in the above-mentioned publication is an oil for use in cutting or grinding of metal. The proportion of the basic lubricant in the lubricating oil composition is 0.1–10 wt % and since the base oil does not evaporate, the basic lubricant is present in the same proportion in the oil coating. Thus, the basic lubricant is no more than an additive to the lubricating oil coating. Accordingly, the composition and the use of the lubricating coating of the present invention are different from those described in the above-mentioned published Japanese application.

Japanese Published Unexamined Patent Application No. 5-306397 (1993) discloses a lubricating composition for hot rolling of steel in which a large amount of an over-basic calcium sulfonate is added to a base oil for hot rolling. This lubricating composition is also different from the composition of the present invention in that the base oil is not volatile and remains in the resulting oil coating. Furthermore, the use is different from that of the present invention.

DETAILED DESCRIPTION OF THE INVENTION

The lubricating coating composition according to the present invention comprises a solvent and a specific basic lubricant as essential components optionally along with other components as described more fully.

[Solvent]

The solvent serves to dissolve or disperse the basic lubricant and optional other lubricants and additives. The solvent is present in the composition in order to make it possible to form a lubricating coating having a uniform thickness and composition in an efficient manner. As a result, the basic lubricant and other lubricating components are uniformly adsorbed by the substrate surface, and it is possible to form a lubricating coating having excellent rust preventing properties even when the coating is thin.

In the present invention, the solvent used is volatile. Namely, in contrast to a base oil which have conventionally been used in a lubricating oil, the solvent vaporizes or evaporate in the course of the formation of a coating, and it does not essentially remain in the resulting lubricating coating. The term "volatile" used herein means that the solvent shows a tendency to vaporize in a temperature from room temperature to 150° C. when in the form of a coating.

The type of solvent is not critical as long as it is an organic liquid which can completely or partially dissolve the basic lubricant and which can easily vaporize during drying after application. Examples of a volatile solvent which is suitable for use in the present invention include petroleum solvents such as cleaning solvents and mineral spirits corresponding to industrial gasoline as specified by JIS K2201, aromatic petroleum naphtha, xylene, and cellosolves. A mixture of two or more of these may be used. Preferably the solvent has a flash point of at least 30° C., an initial boiling point of at least 150° C., and an end point of at most 210° C. since such a solvent is relatively easy to handle and vaporizes quickly to reduce the time required for drying.

[Basic Lubricant]

At least one basic lubricant selected from a basic sulfonate, a basic salicylate, and a basic phenate is used as a main lubricating component in the lubricating coating composition according to the present invention. The main lubricating component may not always be present in the largest amount in the composition, but it is the component that it plays the principal role in lubrication for the inventive composition.

Each of these basic lubricants is a salt constituted by an aromatic acid and an excess amount of an alkali. As described below, this type of a basic lubricant contains the excess alkali in the form of colloidal particles which are dispersed in an oily substance, and it is a semi-solid or viscous fluid like a grease at room temperature.

A. Basic Sulfonate:

The sulfonic acid portion which constitutes a basic sulfonate may be a petroleum sulfonic acid, which is obtained by sulfonation of aromatic components in a petroleum distillate, or a synthetic aromatic sulfonic acid. Examples of a synthetic aromatic sulfonic acid include dodecylbenzenesulfonic acid, dinonylnaphthalenesulfonic acid, and the like. The cationic portion or salt of this sulfonate may be an alkali metal or an alkaline earth metal salt. Of these salts, an alkaline earth metal salt, and particularly calcium salt, barium salt, and magnesium salt are preferred. These salts will give nearly the same effect as each other.

By way of example, a basic calcium sulfonate will be explained below, but the basic sulfonate is not limited to such a calcium salt. Basic calcium sulfonate is commercially available. Examples of a commercial product are Sulfol 1040 manufactured by Matsumura Petroleum Institute, and Lubrizol 5318 manufactured by Japan Lubrizol.

A basic calcium sulfonate is prepared by dissolving a neutral sulfonate salt in a suitable solvent, such as one selected from an aromatic hydrocarbon, an alcohol, and mineral oil, adding calcium hydroxide in an amount sufficient to give the base number required for the basic calcium sulfonate, and mixing. Thereafter, an excess amount of carbon dioxide gas to carbonate the added calcium hydroxide is passed through the mixture, which is then filtered in the presence of a filter aid such as activated kaolin. The filtrate is distilled in vacuo to remove the volatile solvent, leaving the desired basic calcium sulfonate as a residue.

The basic calcium sulfonate which is prepared by this method is a semi-solid or viscous fluid like a grease, which contains colloidal fine particles of calcium carbonate dispersed in an oily substance in a stable manner. Since the dispersed particles of calcium carbonate can function as a solid lubricant, particularly under severe fastening conditions with a small thread interference, the basic calcium sulfonate can exhibit remarkably superior lubricity compared to a typical liquid lubricating oil. Furthermore, in the case in which the frictional surface has minute irregularities (surface roughness), the basic calcium sulfonate can exhibit an even more excellent galling-resisting effect on a threaded joint for oil well pipes, due to the combined effect of the micro-fluid film lubrication effect caused by hydrostatic pressure and the solid lubrication effect of the fine particles.

With the aforementioned compound grease which has conventionally been applied to a threaded joint for oil well pipes prior to fastening, a powder of a heavy metal such as Pb contained therein act as a solid lubricant, and resistance to galling and gas tightness required to fasten the threaded joint of an oil well pipe is provided by a combination of the solid lubrication effect of the powder and the fluid film lubrication effect of the grease. In a lubricating coating composition according to the present invention, a basic sulfonate by itself can exhibit both a solid lubrication effect and a fluid film lubrication effect, and therefore it can impart to a threaded joint for oil well pipes the same resistance to galling and gas tightness as a compound grease does without using a heavy metal powder. This effect of a basic sulfonate can be also obtained with a basic salicylate or a basic phenate.

B. Basic Salicylate:

The basic salicylate may be an alkali metal salt or an alkaline earth metal salt of an alkyl salicylic acid. The alkyl salicylic acid can be prepared by the Kolbe-Schmitt reaction from an alkyl phenol, which is obtained by alkylation of phenol using an alpha-olefin having from about 14 to about 18 carbon atoms. The salt is preferably an alkaline earth metal salt and particularly a calcium salt, a barium salt, or a magnesium salt.

A basic salicylate can be prepared by converting a neutral salicylate salt into a basic salt by the same method as explained with respect to a basic sulfonate. It is a semi-solid or viscous substance like a grease and contains the alkali carbonate as colloidal particles dispersed in an oil. A basic calcium salicylate is also commercially available. Examples of commercial products include OSCA 431 and OSCA 453 of OSCA Chemicals, and SAP 005 of Shell Chemicals.

C. Basic Phenate:

A basic phenate can be prepared by converting a neutral phenate salt into a basic salt by the same method as described with respect to a basic sulfonate. The neutral phenate can be obtained by reacting an alkyl phenol as described above with a metal hydroxide in the presence of elemental sulfur in an alcohol solvent. The basic phenate also is a semi-solid or viscous fluid like a grease and contains the excess alkali carbonate as colloidal particles dispersed in an oil. The salt is preferably an alkaline earth metal salt, particularly a calcium salt, a barium salt, or a magnesium salt.

In a lubricating coating composition according to the present invention, at least one basic lubricant selected from the basic sulfonate, basic salicylate, and basic phenate is used as a main lubricant. When using two or more basic lubricants, they may be either of the same class (such as two basic sulfonates), or of different classes (such as a combination of a basic sulfonate and a basic salicylate).

The higher the base number of the basic lubricant which is employed, the greater the amount of the excess carbonate fine particles which function as a solid lubricate, and the higher the lubricity and resistance to galling. In addition, a lubricating coating having a degree of basicity higher than a certain level has an increased rust preventing properties due to its effect of neutralizing acidic substances which may cause rusting. For these reasons, the basic lubricant used in the present invention preferably has a base number (JIS K2501) (when two or more basic lubricants are used, the weighted average of the base numbers thereof in terms of their amounts) of at least 50 mg KOH/g. However, a basic lubricant having a base number exceeding 500 mg KOH/g has an increased hydrophilic nature and decreased rust preventing properties. The base number of the basic lubricant is more preferably in the range of 100–500 mg KOH/g, and most preferably in the range of 250–450 mg KOH/g.

[Thermoplastic Resin]

The lubricating coating composition according to the present invention preferably further comprises a thermoplastic resin, since such a resin serves to increase the thickness of the lubricating coating and also the resistance to galling when it is introduced into the frictional interface.

Examples of useful thermoplastic resins include, though not limited thereto, polyethylene resins, polypropylene resins, polystyrene resins, polymethylacrylate resins, styrene/acrylate copolymer resins, polyamide resins, and the like. A copolymer or a blend of these resins or of these resins and another thermoplastic resin may be used. The density (JIS K7112) of the thermoplastic resin is preferably in the range of 0.9–1.2. On account of the need for the resin to easily deform on the frictional surface and to exhibit lubricity, the thermoplastic resin preferably has a thermal deformation temperature (JIS K7206) of 50–150° C.

The thermoplastic resin, when present as particles in the lubricating coating, can exhibit an effectively improved resistance to galling, since the particles exert a lubricating action similar to that of a solid lubricant when introduced into the frictional interface. Therefore, the thermoplastic resin is preferably in the form of a powder, particularly of spherical shape, and are not soluble in the organic solvent used in the lubricating coating composition. As long as the thermoplastic resin powder can be dispersed or suspended in the solvent, it may be swollen therein.

It is advantageous for the thermoplastic resin powder to have a fine particle diameter in order to increase the viscosity of the composition and hence the thickness of the resulting coating and improve resistance to galling. However, particles smaller than 0.05 micrometers in diameter cause the lubricating coating composition to have a marked tendency toward gelling, thereby making it difficult to form a coating with a uniform thickness. Particles greater than 30 micrometers in diameter are difficult to introduce into the frictional interface and easy to separate by settling or floating in the composition, thereby making it difficult to form a homogeneous coating. Accordingly, the particle diameter is preferably in the range of 0.05–30 micrometers, and more preferably is in the range of 0.07–20 micrometers.

[Other Lubricants]

The lubricating coating composition according to the present invention may further include one or more lubricants other than the above-described basic lubricant. Some non-limiting examples of such other lubricants which can be used in the present invention include alkaline earth metal salts or alkali metal salts of fatty acids, synthetic esters, natural oils and fats, waxes, and mineral oil. Incorporation of one or more other lubricants not only makes it possible to decrease the cost of a lubricating coating composition according to the present invention, but in some cases, makes it possible to improve its properties.

An alkaline earth metal salt or alkali metal salt of a fatty acid exhibits properties similar to those of the above-described basic lubricant such as a basic sulfonate, although not of the same level, and it may be included in the inventive composition as a diluting component. From the viewpoints of lubricity and rust prevention, the fatty acid preferably has 12–30 carbon atoms. The fatty acid may be either a mixed fatty acid derived from a natural oil or fat or a single fatty acid compound. The salt of the fatty acid is preferably a calcium salt, and it may be a neutral salt or a basic salt.

A synthetic ester has the effect of increasing the plasticity of the thermoplastic resin, and at the same time, it can increase the fluidity of the lubricating coating under hydrostatic pressure. Therefore, a synthetic ester is preferably be present in a lubricating coating composition according to the present invention. A high-melting synthetic ester can also be used to adjust the melting point and the hardness or softness of the resulting lubricating coating.

Synthetic esters suitable for use in the present invention include, though not limited thereto, fatty acid monoesters, dibasic acid diesters, and fatty acid esters of trimethylolpropane and pentaerythritol. Examples of a fatty acid monoester include monoesters of a carboxylic acid having 12–24 carbon atoms with a higher alcohol having 8–20 carbon atoms. Examples of a dibasic acid diester include diesters of a dibasic acid having 6–10 carbon atoms with a higher alcohol having 8–20 carbon atoms. Examples of the fatty acid constituting the fatty acid ester of trimethylolpropane or pentaerythritol are those having 8–18 carbon atoms.

In addition, natural oils and fats such as beef tallow, lard, wool grease, palm oil, rape seed oil, and coconut oil; waxes such as natural wax or paraffin wax having a molecular weight of 150–500; and mineral oil or synthetic mineral oil having a viscosity of 10–300 cSt at 40° C. can be used to adjust the viscosity of the lubricating coating.

[Extreme Pressure Agent]

An extreme pressure agent may be present in the inventive lubricating coating composition since it increases resistance to galling. Non-limiting examples of an extreme pressure agent include sulfurized oils and fats, polysulfides, phosphates, phosphites, thiophosphates, and dithiophosphoric acid metal salts.

Examples of the preferred sulfurized oils and fats are those compounds having a sulfur content of 5–30 wt % prepared by adding sulfur to an animal or vegetable oil or fat having unsaturated bonds followed by heating.

The polysulfide include dialkyl, diaryl, diaralkyl, and dialkylaryl polysulfides and sulfurized olefins, each having 2–5 successive sulfide groups. Examples of preferred polysulfides include dibenzyl disulfide, di-tert-dodecyl polysulfide, and di-tert-nonyl polysulfide.

The phosphate, phosphite, thiophosphate, and dithiophosphoric acid metal salt may be those having the following formulas:

phosphate: $(R_3O)(R_4O)P(=O)(OR_5)$
phosphite: $(R_3O)(R_4O)P(OR_5)$
thiophosphate: $(R_3O)(R_4O)P(=S)(OR_5)$
dithiophosphoric acid metal salt: $[(R_3O)(R_6O)P(=S)-S]_2-Me$ In the above formulas, $R_3$–$R_6$ each stand for an alkyl group, a cycloalkyl group, an alkylcycloalkyl group, an aryl group, an alkylaryl group, or an arylalkyl group each having up to 24 carbon atoms, or $R_4$ and $R_5$ may be hydrogen. Me stands for molybdenum (Mo), zinc (Zn), or barium (Ba).

Particularly preferred examples of these compounds include tricresyl phosphate and dioctyl phosphate for the phosphates; tristearyl phosphite, tridecyl phosphite, and dilauryl hydrogen phosphite for the phosphites; tridodecyl and tritridecyl thiophosphates and trialkylphenyl thiophosphate for the thiophosphates; and zinc dialkyl dithiophosphate in which $R_3$ and $R_6$ are primary or secondary alkyl groups having 3–20 carbon atoms for the dithiophosphoric acid metal salts.

[Lubricating Coating Composition]

The amount of each component of the lubricating coating composition of the present invention is not particularly limited as long as the composition can form a lubricating coating which exhibits excellent resistance to galling at the time of fastening a threaded joint for oil well pipes and which imparts good rust preventing properties. However, the preferred amount of each component is as follows.

The volatile organic solvent is present in the composition in an amount sufficient to dissolve or disperse the basic lubricant and the other lubricants and additives, provide the composition with good wettability to the surface to be coated and spreadability, and facilitate adsorption of the basic and other lubricants by the surface of the joint. If the amount of the solvent is too small, the viscosity of the composition becomes so high as to interfere with coating procedures or make it difficult to achieve the above-described effects adequately. On the other hand, if the amount of the solvent is too large, the resulting coating becomes too thin to sufficiently achieve the desired lubrication and rust preventing properties. The solvent is preferably present in the lubricating coating composition in an amount of 25–80 wt %, and more preferably 30–70 wt %.

Since the solvent does not substantially remain in the lubricating coating formed after drying, the lubricating coating is constituted by the remaining nonvolatile components other than the solvent. Accordingly, the amount of each component when the total of all the nonvolatile components is taken as 100 parts by weight is generally equal to the amount of each component in the lubricating coating. The amount of each component other than the solvent is expressed in wt % based on the total of the components other than the solvent being 100 wt % in order to indicate its content in a dry coating.

The basic lubricant which is a main component of the lubricating coating of the present invention generally comprises 10–100 wt % of the lubricating coating. It is preferably present in an amount in the range of 15–100 wt %, more preferably 20–100 wt %, and most preferably 30–80 wt %.

It is also preferred that the amount of the basic lubricant be selected so that the resulting lubricating coating has a base number of at least 50 mg KOH/g. For example, a lubricating coating containing 20 wt % of a basic lubricant having a base number of 400 mg KOH/g as the sole basic component will have a base number of 80 mg KOH/g. Thus, as the base number of the basic lubricant is increased, the amount of the basic lubricant can be decreased with other lubricants being present in an increased amount.

The thermoplastic resin may be present in the lubricating coating in an amount in the range of 0–30 wt %. A larger amount of the resin, particularly in powder form, may cause significant gelling, thereby making it difficult to form a coating with a uniform thickness. The amount of the thermoplastic resin is preferably at most 20 wt %, and more preferably at most 15 wt %. In order to improve resistance to galling by the addition of a thermoplastic resin, the amount of a thermoplastic resin in the lubricating coating is preferably at least 0.5 wt % and more preferably at least 1 wt % and most preferably at least 2 wt %.

The amount of other lubricants in the lubricating coatings is preferably in the range of 0–90 wt % and more preferably is at most 75 wt % and still more preferably is at most 60 wt %. Since other lubricants can make it easy to form a uniform lubricating coating, it is preferred that the composition contain at least 5 wt % of one or more other lubricants. As stated above, when the basic lubricant has a high base number, lubricity tends to be impeded less significantly by the addition of other lubricants in a large amount.

The amount of an extreme pressure agent in the lubricating coating is preferably in the range of 0–15 wt % and more preferably at most 10 wt %. In order to obtain the effect of improving resistance to galling by an extreme pressure agent, it is preferably present in an amount of at least 1 wt %. If the amount of the extreme pressure agent is too large, it may have an adverse effect on rust preventing properties.

In addition to the above-described components, a lubricating coating composition according to the present invention may further include one or more additional components such as an antioxidant, a preservative, a coloring agent, and the like.

There are no particular limits on the properties such as the viscosity, the base number, and the saponification number (value) of the lubricating coating composition according to the present invention, but preferably they are in the following ranges.

The viscosity of the lubricating coating composition measured at 40° C. is preferably in the range of 2–300 cSt and more preferably 3–250 sSt. A viscosity of less than 2 cSt may result in the formation of a lubricating coating which is too thin to achieve adequate rust preventing properties. If the viscosity is larger than 300 cSt, it becomes difficult to form a coating with a uniform thickness. The viscosity can be adjusted by the amount of the solvent.

As suggested above, the base number of the lubricating coating composition is preferably such that the lubricating coating formed therefrom after drying (evaporation of the solvent) has a base number in the range of 50–500 mg KOH/g and more preferably in the range of 100–500 mg KOH/g. The base number of the coating can be adjusted by the base number and the content of the basic lubricant and the other basic components, if any.

The saponification number of the lubricating coating composition is preferably such that the coating formed therefrom after drying has a saponification number in the range of 30–100 mg KOH/g. The saponification number comes from various oils and fats or their derivatives used as the other lubricants and as an extreme pressure agent, and it can be adjusted by the saponification numbers and the amounts of these components. The saponification number may be zero when these components are not used at all.

[Application to a Threaded Joint for Oil Well Pipes]

The present invention will be described with respect to an embodiment in which a lubricating coating composition according to the present invention is applied to a typical threaded joint for oil well pipes, although the lubricating coating composition can be applied to a threaded joint for other metal pipes.

Figure 3:
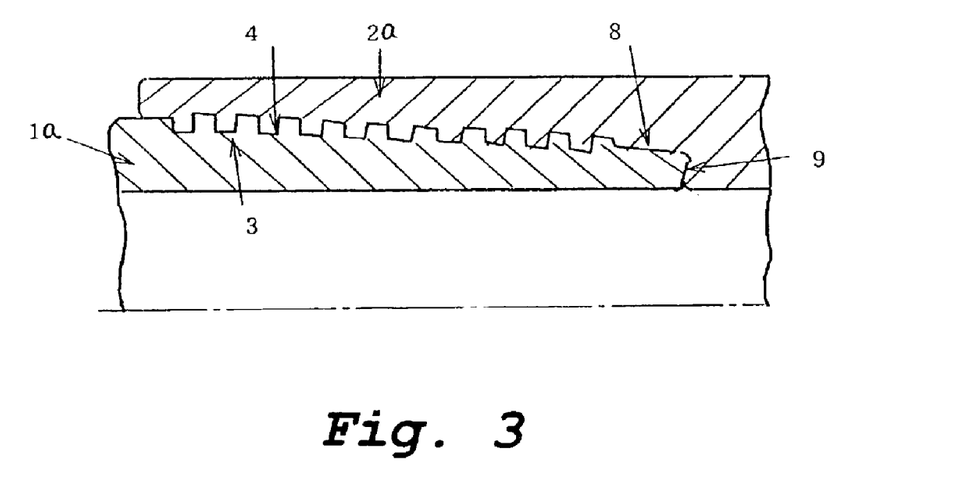
FIG. 3 is a schematic diagram showing a threaded joint for oil well pipes.

FIG. 3 is a schematic longitudinal cross-sectional view of a portion of a typical threaded joint for oil well pipes. In the figure, 1a indicates a pin formed on an oil well pipe at its end, 2a indicates a box formed on a coupling member, 3 indicates an externally threaded portion of the pin, 4 indicates an internal threaded portion of the box, 8 indicates an unthreaded metal contact portion of each of the pin 1a and box 2a, and 9 indicates a shoulder portion.

Figure 4:
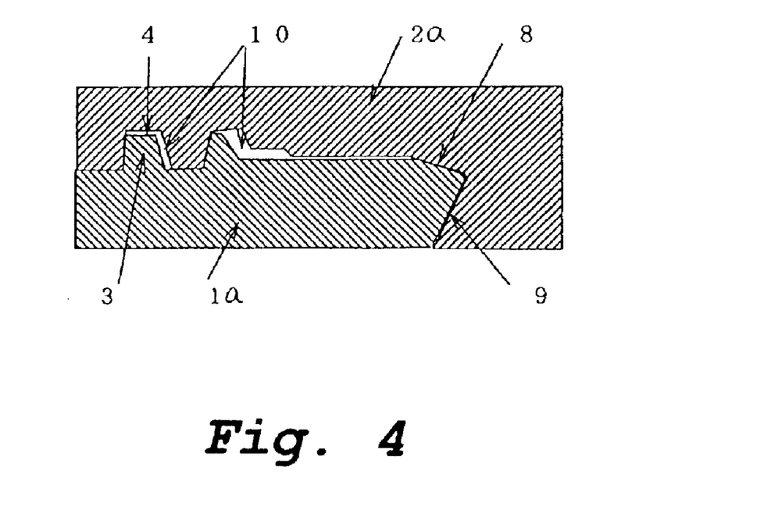
FIG. 4 is a schematic diagram showing that minute gaps (stand-offs) are present in the threaded portions and the unthreaded contact portions of a threaded joint for oil well pipes.

FIG. 4 is an enlarged view of a portion of FIG. 3 showing the unthreaded metal contact portions 8 and an adjacent area of the threaded portions 3, 4 of the pin 1a and the box 2a, respectively. This figure shows that there are slight gaps (stand-offs) 10 in the threaded portions and the unthreaded metal contact portions. In FIG. 4, the same elements as in FIG. 3 have the same reference numbers.

Figure 5A:
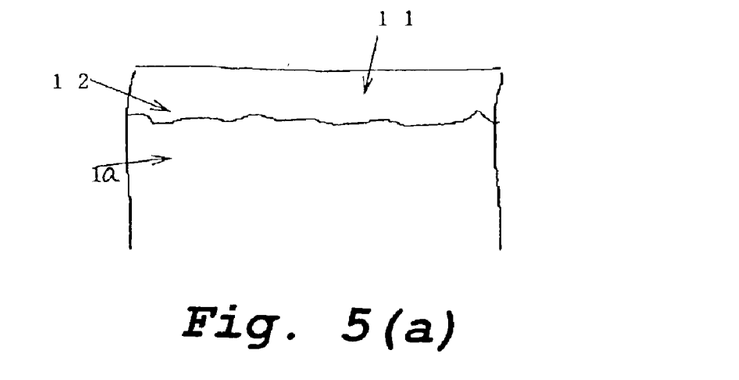
FIGS. 5(a), 5(b), and 5(c) are enlarged schematic cross sections showing a lubricating coating formed on a surface-pretreated unthreaded metal contact portion of a pin in some embodiments of a threaded joint for oil well pipes according to the present invention.
Figure 5B:
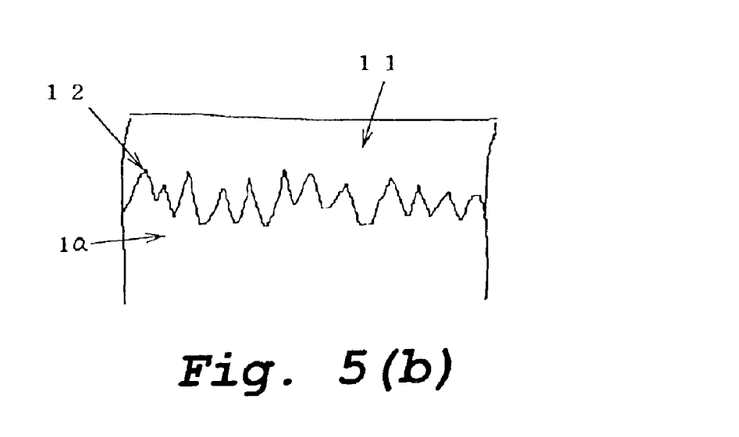
Figure 5C:
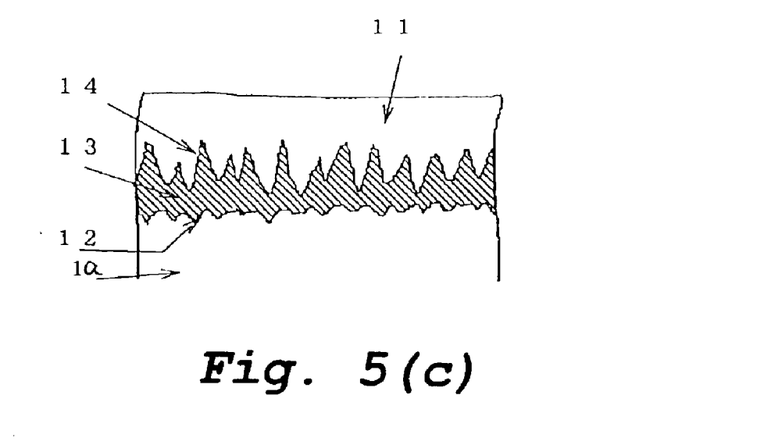

FIGS. 5(a), 5(b), and 5(c) are enlarged schematic cross-sectional views of a lubricating coating according to the present invention formed on a threaded joint for oil well pipes having different types of surface pretreatment, showing the unthreaded metal contact portion of a pin 1a. FIG. 5(a) shows an embodiment in which a lubricating coating 11 is formed on the surface 12 of a pin 1a having a relatively small surface roughness created by machining, for example. FIG. 5(b) shows an embodiment in which a lubricating coating 11 is formed on a roughened surface 12 of a pin 1a which can be produced by sand or grit blasting following machining, for example. FIG. 5(c) shows an embodiment in which a lubricating coating 11 is formed on a pretreatment coating 13 having a large surface roughness, such as a manganese phosphate coating formed by chemical conversion treatment, which is formed on the surface 12 of a pin 1a having a relatively small surface roughness created by machining, for example. Reference number 14 indicates the surface of the pretreatment coating 13.

Figure 6:
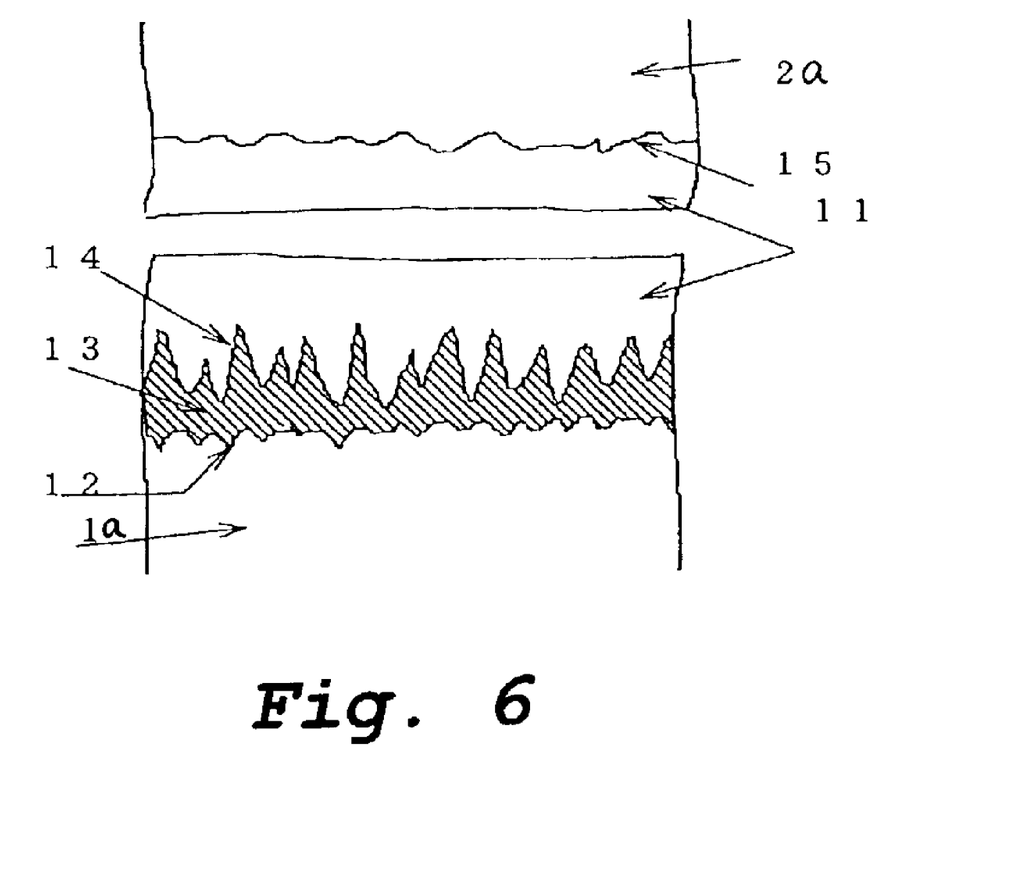
FIG. 6 is an enlarged schematic cross section showing a lubricating coating formed on the unthreaded metal contact portions of another embodiment of a threaded joint for oil well pipes according to the present invention.

FIG. 6 shows a lubricating coating, in the same manner as in FIGS. 5(a) to 5(c), of an embodiment in which both the surface 15 of a box 2a and the surface 12 of a pin 1a have a lubricating coating 11. In this particular embodiment, the box 2a has a pretreatment coating 13, such as a manganese phosphate coating, having a rough surface 14 on which the lubricating coating 11 is formed.

As shown in FIG. 3, a typical threaded joint for oil well pipes comprises a pin 1a and a box 2a capable of mating with each other. The pin 1a has a mating surface comprising an externally threaded portion 3 and an unthreaded metal contact portion 8 formed on the outer surface at each end portion of the oil well pipe. More precisely, the unthreaded metal contact portion 8 is located at the tip of the pipe and extends inwardly from the tip to the threaded portion 3. Similarly, the box 2a has a mating surface comprising an internally threaded portion 4 and an unthreaded metal contact portion 8 formed on the inner surface of a sleeve-shaped threaded coupling member.

It is also possible to form a pin on a coupling member and to form a box on an oil well pipe, or to form a pin on one end and a box on the opposite end of each oil well pipe. The material used to form the threaded joint, i.e., the material forming the oil well pipe and coupling member is not critical, but it is usually a steel including a carbon steel, a high alloy steel, and a stainless steel.

The pin and the box have a shape so as to mate with each other. However, if they are closely observed, there are minute gaps (stand-offs) between the pin and box, particularly in threaded portions, as shown in FIG. 4. If such gaps are not present to provide stand-offs, it is practically impossible to perform fastening operation. A fluid lubricant can enter these minute gaps to fill the gaps, and under the pressure produced during fastening, it seeps into the surrounding areas from the gaps, thereby effectively preventing the occurrence of galling. Therefore these gaps contribute to lubrication. A lubricating coating formed from a composition according to the present invention is semi-dry like a compound grease, so it can exhibit this seeping behavior and impart excellent lubricity and gas tightness.

According to the present invention, a lubricating coating is formed on the mating surface of a pin and/or a box by applying a lubricating coating composition according to the present invention followed by drying. The application can be performed by any suitable method such as brush coating, spraying, or immersion, and drying is preferably conducted at room temperature or by hot air up to 150° C. until the solvent is evaporated substantially completely.

The lubricating coating is preferably formed on the entire mating surface, i.e., on the surface of both the threaded portion and the unthreaded metal contact portion, of the pin and/or box. However, it is also possible and within the scope of the present invention to form the lubricating coating on a part of the mating surface or surfaces. In this case, it is preferred that the lubricating coating be formed on at least the surface of the unthreaded metal contact portion, which is more susceptible to seizing and galling than the threaded portion.

Either or both of the pin and box can be lubricated in the above manner. Thus, only the pin can be lubricated as shown in FIGS. 5(a) to 5(c), or only the box can be lubricated. Alternatively, both the pin and box can be lubricated as shown in FIG. 6.

As described previously with respect to FIG. 1, an oil well pipe is frequently shipped with the pin on one of its ends having a box of a coupling already secured thereto. In this case, the pin and box which are to be fastened to each other before shipment can be effectively protected from rusting if the lubricating coating according to the present invention is formed on the mating surface of either the pin or the box. Of course, both the pin and box may be coated in this case. For the other pin and box which are open and exposed to the atmosphere before the oil well pipe is connected to another oil well pipe in a well, it is preferred that the lubricating coating be formed on both the pin and the box to prevent all the mating surfaces from rusting. As a result, a decrease in lubricity and gas tightness due to rusting can be prevented. Alternatively or additionally, the open pin and box may be protected from rusting by using a protector or other known technique. In such a case, a lubricating coating according to the present invention may be formed on either the pin or the box to attain the desired lubricity when the pin or box is fastened to another member.

FIG. 5(b) and 5(c) show embodiments in which the pin is subjected to surface roughening treatment. Such treatment may be performed on the box, or it may be performed on both the pin and the box. The coupling member constituting the box is much shorter in length than the pipe constituting the pin, and hence it is easier to handle. Therefore, from the standpoint of ease of operation, it is advantageous to perform surface-roughening treatment only on the box.

[Thickness of the Lubricating Coating]

A threaded joint for oil well pipes having a lubricating coating formed thereon according to the present invention can prevent galling even under severe lubricating conditions in which an excessively high surface pressure is applied locally to the mating surface of the pin or box to such a degree that the pressure causes plastic deformation, as encountered on those occasions where eccentricity or leaning of the threaded joint occurs due to misalignment of the pipe or foreign matter is present between the mating surfaces. For this purpose, it is critical that the lubricant be introduced and maintained between the frictional (mating) surfaces.

Accordingly, a lubricating coating composition is applied in an amount sufficient to fill the minute gaps between mating surfaces such as between threads as shown in FIG. 4. If the amount is too small, the resulting semi-dry coating cannot be expected to have its inherent effect that the lubricant confined in the minute gaps or surface irregularities seeps into the surrounding frictional surfaces by the action of the hydrostatic pressure generated by fastening. For this reason, the lubricating coating preferably has a thickness of at least 10 micrometers and more preferably at least 20 micrometers. A thickness of at least 10 micrometers for the lubricating coating according to the present invention is also sufficient with respect to rust prevention.

In the case where the lubricating coating is formed on a roughened surface, however, the thickness of the lubricating coating is preferably larger than the value for Rmax of the surface. The thickness of the lubricating coating in this case is determined as a mean value between the maximum and minimum thickness of the coating formed on the roughened surface.

A lubricating coating composition according to the invention includes a solvent in order to make application easier and facilitate uniform adsorption of the basic lubricant and other lubricants. Therefore, the composition has a relatively low viscosity and can form a thin, semi-dry coating effectively. In addition, the lubricating coating contains as a main component a basic lubricant such as a basic sulfonate, which exhibits high lubricity. Thus, adequate lubricity can be obtained with a relatively thin coating. Making the coating too thick not only causes the lubricant to be wasted, but also runs counter to one of the objects of the present invention which is to prevent environmental pollution. From this viewpoint, the upper limit on the thickness on the lubricating coating is preferably around 200 micrometers. A more preferred thickness of the lubricating coating is 30–150 micrometers.

[Surface Roughness]

A threaded joint for oil well pipes manufactured by machining typically has a surface roughness (Rmax) of 3–5 micrometers. The mating surfaces of the joint, i.e., the surfaces of the threaded portions and the unthreaded metal contact portions of a pin and/or box, on which a lubricating coating is to be formed according to the present invention, is preferably pretreated, e.g., by sand blasting, so as to have an increased surface roughness, thereby making it possible to further improve the resistance to galling of the coating. This is because such a roughened surface can confine the lubricant in the minute recesses formed thereon and more effectively achieve the above-described effect that the lubricant confined in the recesses seeps into the surrounding frictional surface by the action of the hydrostatic pressure generated at the time of fastening.

This effect can be achieved regardless of the pretreatment method used to roughen the surface. A surface roughness after roughening with Rmax in the range of 5–40 micrometers is suitable. If the surface roughness exceeds 40 micrometers, the periphery of surface recesses may not be adequately sealed, and it becomes difficult to produce sufficient hydrostatic pressure to obtain an adequate lubricity by the seeping effect. Rmax is more preferably in the range of 10–30 micrometers.

The following methods (1) to (5) can be employed for pretreatment to impart a greater surface roughness to the mating surfaces of the pin and/or the box, although other methods may be used. Of these, methods (1) and (2) involve nonuniform removal of the material from the surface to roughen the surface itself, as shown in FIG. 5(b). Methods (3)–(5) involve the formation of an underlying pretreatment coating having a large surface roughness as shown in FIG. 5(c) and for pin in FIG. 6.

(1) Sand or grit blasting: The surface roughness obtained by this method can be varied by the size of blasting particles used.

(2) Acid etching: Immersion in a strong acid such as sulfuric acid, hydrochloric acid, nitric acid, or hydrofluoric acid can roughen the surface of the joint.

(3) Phosphating: A chemical conversion coating such as a manganese phosphate, zinc phosphate, iron manganese phosphate, zinc calcium phosphate, or similar coating, which is crystalline and has a large surface roughness, may be formed as a pretreatment coating. In general, as the crystals grow, the roughness of the coating increases.

(4) Electroplating: Metal plating, preferably copper or iron plating may be performed as a pretreatment for surface roughening. The plated metal is preferentially deposited on projections of the surface, whereby the surface becomes slightly rougher.

(5) Dry-process impact (mechanical) plating: This method employs particles having an iron core coated with a metal or alloy to be plated such as zinc or an zinc-iron alloy. The plating is performed by blasting the particles at a surface using centrifugal force or air pressure to deposit the coated metal of the particles on the surface.

These surface-roughening pretreatment methods are easier to perform on a box, but they may be performed on a pin, or they may be performed on both. Methods (3), (4), and (5) are advantageous in that they result in the formation of a pretreatment coating which can prevent metal contact between the pin and the box when the lubricant coating has been used up, thereby making it possible to improve both resistance to galling and rust preventing properties. In particular, a coating of manganese phosphate is preferred since it bristles with acicular crystals like a carpet and tends to have an increased surface roughness and high capacity of holding lubricants. As a result, when the lubricating coating composition according to the present invention is applied onto the pretreatment coating of manganese phosphate, a particularly effective semi-dry lubricating coating can be formed. Some materials used to form an oil well pipe such as high alloy steels are difficult or impossible to subject to phosphating. In such cases, phosphating can be performed following electroplating with iron as described above in (4).

The thickness of a pretreatment coating as described above is preferably larger than the surface roughness imparted by that coating in order to improve its capacity for holding lubricants and adhesion of the coating to the substrate surface. More preferably, the thickness is on the order of 5–20 micrometers larger than the above-described preferred Rmax, which is in the range of 5–40 micrometers.

A threaded joint according to the present invention can be used without being coated with a compound grease. In such a case, if the threaded joint is stored for a prolonged period, it may possibly suffer rusting. In order to cope with such a problem, both ends of an oil well pipe assembled with a coupling member as shown in FIG. 1, i.e., the pin on the end of the pipe not connected to a coupling member (the left end in FIG. 1) and the end of the coupling member not connected to the pipe (the right end of the coupling in FIG. 1) can be protected by fitting protectors each having a mating thread to form a gas-tight seal with the corresponding threaded portion of the pipe or the coupling.

The following examples are given for the purpose of illustration and not intended to limit the present invention. It should be understood to those skilled in the art that various modifications may be made to the embodiments disclosed herein without departing from the scope of the present invention.

EXAMPLES

In the following Examples, lubricity of a lubricating coating was evaluated by a test using a rotating friction tester as shown in FIG. 2. This test has been confirmed to have a good correlation with a fastening test on a threaded joint of an oil well pipe. In this test, a pair of a mating convex and concave test pieces 5, 6 are used. The convex test piece 5, to which a controlled load can be applied, corresponds to a pin and has an end with a conical shape. The concave test piece 6, which can be rotated at a controlled speed, corresponds to a box and has a recess with the same conical shape as the convex test piece 5. The two test pieces were made of the same steel, which was either an Mn steel (a carbon steel) or a 13Cr steel (a stainless steel) having the composition shown in Table 1, both of which are actually used in the manufacture of oil well pipes and coupling members. The mating or contact surfaces 7 of the test pieces had a lubricating coating formed thereon for evaluation.

Rust preventing properties were evaluated by a salt spray test as set forth in JIS Z2371.

Various lubricating coating compositions were prepared by thoroughly mixing constituents selected from those shown in Table 2 in a homomixer. The mixing caused the basic lubricant to be dissolved nearly completely in the solvent.

Each of the compositions was applied with a brush to the contact surfaces of two pairs of convex/concave test pieces having their surface roughness adjusted by one of the methods shown in Table 3 and was dried at room temperature for 24 hours to substantially remove the solvent and form a lubricating coating.

One pair of convex/concave test pieces was used to evaluate the lubricity of the coating by its load carrying capacity in the following manner. A lubricating coating was formed on only the concave test piece, and a friction test was carried out under the conditions shown in Table 4 to measure the load carrying capacity until galling occurred (Lubricity Test A). In order to simulate a decrease in lubricity caused by incorporation of foreign matter such as scale or rust flakes, as is often encountered during fastening of oil well pipes, the same friction test was repeated after 50 mg of scale flakes collected from actual pipes (having a particle size adjusted to 0.2–2 mm by sieving) were spread on the lubricating coating of the concave test piece (Lubricity Test B).

In the friction test, the load applied was increased in increments of 100 kgf at a time until galling took place, and the maximum load before galling took place was evaluated as the load carrying capacity. In cases in which seizure was slight and fastening was possible after usual recovering treatment, the friction test was continued after such treatment. The values for lubricity shown in Tables 5 and 6 indicate the number of times that the load was increased from zero. For example, a lubricity of 10 indicates that the load carrying capacity was 1000 kgf before galling took place. The maximum load which is applied at the time of fastening of a threaded joint of an oil well pipe is normally on the order of 1000 kgf. Thus, if the results of the lubricity test are 10 or greater, it is presumed that a threaded joint for oil well pipes can be fastened and loosened repeatedly without causing galling.

The other pair of test pieces was used to evaluate rust preventing properties in the following manner. A lubricating coating was formed on both the convex and concave test pieces. In order to simulate the formation of a bruise which can occur during transport of an oil well pipe within a factory or to an oil well excavation site, the two test pieces were placed in the friction tester such that their longitudinal or rotational axes were offset in the horizontal direction by 1 mm with respect to each other, and they were pressed against each other one time with a force of 500 kgf. Then, the test pieces were released and again set in the tester such that their longitudinal or rotational axes were in alignment with each other, and they were subjected to a salt spray test for 240 hours to evaluate rust preventing properties by visual observation of the mating surfaces of the test pieces as follows.

o: no rust and no discoloration;

□: no rust and slight discoloration (acceptable);

Δ: rust formed slightly;

X: rust formed remarkably.

Tables 5 and 6 show the lubricating coating compositions according to the present invention (the proportions of constituents being shown in wt %), the base number, and the viscosity measured at 40° C. of each composition, the dry thickness of the coating formed therefrom (calculated from the increase in the weight of the test piece and the density of the lubricating coating), the surface roughness of each test piece, and the evaluation of lubricity and rust prevention. Table 7 shows the same for Comparative Examples and Conventional Examples.

Of the Conventional Examples in Table 7, Conventional Examples 1, 2, and 4 were examples in which a compound grease (Shell Type III) meeting API standards was applied prior to testing, and in the examples for which supplemental application is indicated, supplementation with the compound grease was carried out, each time the load was increased in the lubricity test or at appropriate intervals in the rust prevention test. The compound grease was applied and supplemented in the amount prescribed for the product. Conventional Example 3 was an example of a lubricating coating containing a solid lubricant in a resin, i.e., a solid lubricant-resin coating, as disclosed in Japanese Published Unexamined Patent Application No. 8-233164 (1996).

TABLE 1

Steel composition of test pieces
(wt %, balance: Fe and inevitable impurities)

| No. | C | Si | Mn | P | S | Cu | Ni | Cr | Mo | Name |
|---|---|---|---|---|---|---|---|---|---|---|
| 1 | 0.24 | 0.30 | 1.30 | 0.02 | 0.01 | 0.04 | 0.07 | 0.17 | 0.04 | Mn Steel |
| 2 | 0.19 | 0.25 | 0.80 | 0.02 | 0.01 | 0.04 | 0.1 | 13.0 | 0.04 | 13 Cr Steel |

TABLE 2

Materials used to prepare lubricating coating composition

| Solvent | |
|---|---|
| A-1 | Mineral spirits (JIS K2201 4) |
| A-2 | Xylene |
| A-3 | Butyl cellosolve |
| Basic lubricant | |
| B-1 | Basic Ca sulfonate (b.n.: 400 mg KOH/g) |
| B-2 | Basic Ba sulfonate (b.n.: 100 mg KOH/g) |
| B-3 | Basic Mg salicylate (b.n.: 150 mg KOH/g) |
| B-4 | Basic Ca phenate (b.n.: 300 mg KOH/g) |
| Thermo-plastic resin powder | |
| C-1 | Polyethylene powder (p.d.: 20 μm) |
| C-2 | Acrylic resin powder (p.d.: 2 μm) |
| C-3 | Styrene resin powder (p.d.: 0.2 μm) |
| Extreme pressure agent | |
| D-1 | Sulfurized lard (S: 10%, s.n.: 180 mg KOH/g) |
| D-2 | Dilauryl hydrogen phosphate |
| D-3 | Zinc Dialkyl dithiophosphate (Zn: 8%, P: 9%, S: 17%) |
| Other lubricant | |
| E-1 | Beef tallow fatty acid Ca soap (s.n.: 20 mg KOH/g) |
| E-2 | Neutral Ca sulfonate (b.n.: 1 mg KOH/g) |
| E-3 | Trimethylolpropane trioleate (s.n.: 160 mg KOH/g) |
| E-4 | Lanolin (s.n.: 100 mg KOH/g) |
| E-5 | Purified mineral oil (ISO VG46) |

(Notes)
b.n. = base number,
s.n. = saponification number
p.d. = particle diameter

TABLE 3

Surface roughness of test pieces

| Mark | R max (μm) | Method of imparting surface roughness |
|---|---|---|
| F-1 | 3 | as machined (no surface roughening) |
| F-2 | 5 | Cu electroplating |
| F-3 | 20 | Sand blasting |
|  | 22 | Sand blasting + Cu electroplating |
| F-4 | 10 | Zinc phosphating treatment |
| F-5 | 20, 25 | Manganese phosphating treatment |
|  | 35, 40 | Sand blasting + Manganese phosphating |
| F-6 | 30 | Peen plating (Zn blasting) on Mn Steel |
|  | 25 | Peen plating (Zn blasting) on 13 Cr Steel |

TABLE 4

Test conditions on rotating friction tester

| | |
|---|---|
| Load | Stepwise increase by 100 kgf at each step |
| Temperature | Room temperature |
| Test period | 30 seconds for each load |
| Number of revolutionsn | 20 rpm |

TABLE 4-continued

Test conditions on rotating friction tester

| | |
|---|---|
| Lubricating coating | Applied only to concave test piece |
| Test A | Normal test (without scale flakes) |
| Test B | Test with introducction of scale flakes |

TABLE 5

| | | Example No.: Carbon (Mn) steel joint | | | | | | | | | | |
|---|---|---|---|---|---|---|---|---|---|---|---|---|
| | Mark | 1 | 2 | 3 | 4 | 5 | 6 | 7 | 8 | 9 | 10 | 11 |
| Lubricating coating composition (wt %) | A-1 | 50 | 50 | 50 | 50 | 60 | 60 | 60 | 50 | | 50 | 20 |
| | A-2 | | | | | | | | | 30 | | 30 |
| | A-3 | | | | | 10 | 10 | 10 | 10 | | | |
| | B-1 | 25 | | | | 5 | | | | 25 | | 25 |
| | B-2 | | 25 | | | | 5 | | | 10 | | |
| | B-3 | | | 25 | | | | 5 | | | 10 | |
| | B-4 | | | | 25 | | | | 15 | | 25 | |
| | C-1 | | | | | | | | | | | |
| | C-2 | | | | | | | | | | | |
| | C-3 | | | | | | | | | | | 0.5 |
| | D-1 | | 1 | | | | 2 | | 5 | | | |
| | D-2 | | | 2 | | | | | | | 3 | |
| | D-3 | | | 2 | | | | 1 | | 5 | | |
| | E-1 | 10 | 10 | | 5 | 5 | | 4 | | | | 10 |
| | E-2 | | | | | | | 5 | | | 12 | |
| | E-3 | 10 | | 13 | 10 | 5 | | 10 | | 10 | 20 | 10 |
| | E-4 | | 3 | | 10 | 5 | 10 | | | 10 | 5 | 4.5 |
| | E-5 | 5 | 9 | 10 | | 10 | 13 | 5 | 2 | 10 | | |
| Base number | | 200 | 50 | 125 | 150 | 67 | 167 | 31 | 113 | 110 | 250 | 200 |
| Viscosity[1] | | 4.0 | 4.3 | 3.8 | 3.9 | 3.2 | 3.5 | 3.7 | 3.6 | 16 | 6.5 | 84 |
| Thickness[2] | | 20 | 25 | 30 | 10 | 40 | 60 | 25 | 30 | 15 | 40 | 100 |
| Surface roughness (Rmax, μm) of convex test piece | F-1 | 3 | 3 | 3 | 3 | | | | | 3 | 3 | |
| | F-2 | | | | | | | | | | | |
| | F-3 | | | | | | | | | | | |
| | F-4 | | | | | 10 | 10 | 10 | 10 | | | 10 |
| | F-5 | | | | | | | | | | | |
| | F-6 | | | | | | | | | | | |
| Surface roughness (Rmax, μm) of concave test piece | F-1 | | | | | | | | | 3 | | |
| | F-2 | | | | 5 | | | | | | | |
| | F-3 | | 20 | 20 | | | | 20 | | | | 20 |
| | F-4 | | | | | | | | | | | |
| | F-5 | 20 | | | | | 40 | | 20 | | 35 | |
| | F-6 | | | | | 30 | | | | | | |
| Lubricity A[3] | | 15 | 15 | 15 | 15 | 14 | 13 | 13 | 14 | 14 | 14 | 17 |
| Lubricity B[4] | | 11 | 11 | 11 | 11 | 11 | 10 | 10 | 11 | 10 | 10 | 13 |
| Rust preven. | | ○ | ○ | ○ | ○ | ○ | ○ | □ | ○ | ○ | ○ | ○ |

(Notes)
[1] Viscosity at 40° C. (cSt or mm²/s);
[2] Thickness of coating (μm);
[3] Load carrying capacity in normal test (×100 kgf);
[4] Load carrying capacity in the presence of scale flakes (×100 kgf).

TABLE 6

| Examples | | Carbon (Mn) steel joint | | | | | Stainless (13 Cr) steel joint | | | | |
|---|---|---|---|---|---|---|---|---|---|---|---|
| | Mark | 12 | 13 | 14 | 15 | 16 | 17 | 18 | 19 | 20 | 21 |
| Lubricating Coating Composition (wt %) | A-1 | 50 | | 20 | 25 | 40 | | 40 | 40 | 50 | 40 |
| | A-2 | | 30 | 10 | 10 | | 30 | | | | |
| | A-3 | | 10 | 10 | | | | | | | |
| | B-1 | | 20 | | 25 | | | 20 | | 20 | |
| | B-2 | 25 | | 25 | | | | | | | |
| | B-3 | | | | | 20 | 10 | | | | 20 |
| | B-4 | | 10 | | | | 25 | | 30 | | |
| | C-1 | | | 2 | | 4 | | | 1 | | 5 |
| | C-2 | 0.5 | | 1 | 3 | | | | | 10 | |
| | C-3 | | 10 | | 1 | | | | | | |

TABLE 6-continued

| Examples | | Carbon (Mn) steel joint | | | | | Stainless (13 Cr) steel joint | | | | |
|---|---|---|---|---|---|---|---|---|---|---|---|
| | Mark | 12 | 13 | 14 | 15 | 16 | 17 | 18 | 19 | 20 | 21 |
| | D-1 | | | | 2 | 2 | | | | | 2 |
| | D-2 | | | | 1 | 3 | | | | | |
| | D-3 | | | | | | | | 4 | | 2 |
| | E-1 | 10 | | | | | 10 | | | | |
| | E-2 | | | 5 | | | 10 | | | | |
| | E-3 | 10 | | 10 | | 15 | 10 | 20 | 20 | | 10 |
| | E-4 | 4.5 | | 7 | | | | 10 | 25 | | 5 |
| | E-5 | | 20 | 10 | 33 | 16 | | | | | 16 |
| Base number | | 50 | 183 | 42 | 154 | 83 | 143 | 133 | 50 | 160 | 100 |
| Viscosity[1] | | 67 | 250 | 144 | 182 | 132 | 15 | 7.8 | 115 | 238 | 166 |
| Thickness[2] | | 80 | 300 | 150 | 180 | 120 | 25 | 35 | 80 | 200 | 150 |
| Surface roughness (Rmax, μm) of convex test piece | F-1 | | | | 3 | 3 | 3 | | | 3 | 3 |
| | F-2 | | | | | | | 5 | 5 | | |
| | F-3 | | | 20 | 20 | | | | | | |
| | F-4 | 10 | 10 | | | | | | | | |
| | F-5 | | | | | | | | | | |
| | F-6 | | | | | | | | | | |
| Surface roughness (Rmax, μm) of concave test piece | F-1 | | | 3 | | | | | | | |
| | F-2 | | | | | | | | 5 | | |
| | F-3 | | | | | 20 | 22 | | 22 | | |
| | F-4 | | | | | | | | | | |
| | F-5 | 25 | 40 | 20 | | | | | | | |
| | F-6 | | | | | | | 25 | | | 25 |
| Lubricity A[3] | | 15 | 15 | 15 | 15 | 16 | 14 | 13 | 16 | 14 | 15 |
| Lubricity B[4] | | 12 | 12 | 12 | 12 | 13 | 10 | 10 | 12 | 11 | 12 |
| Rust prevention | | ○ | ○ | □ | ○ | ○ | ○ | ○ | ○ | ○ | ○ |

(Notes)
[1]Viscosity at 40° C. (cSt or mm²/s);
[2]Thickness of coating (μm);
[3]Load carrying capacity in normal test (×100 kgf);
[4]Load carrying capacity in the presence of scale flakes (×100 kgf).

TABLE 7

| | | Comparative Example No. (Mn steel joint) | | | | Conventional Example No. | | | |
|---|---|---|---|---|---|---|---|---|---|
| | Mark | 1 | 2 | 3 | 4 | 1 | 2 | 3 | 4 |
| Lubricating Coating Composition (wt %) | A-1 | | 50 | | | Grease Lubrication | Grease Lubrication | MoS₂/epoxy resin Coating | Grease Lubrication |
| | A-2 | | | | 30 | | | | |
| | A-3 | | | | 10 | | | | |
| | B-1 | | | 20 | | | | | |
| | B-2 | 50 | | | | | | | |
| | B-3 | | | | | Mn steel | Mn steel | | 13 Cr steel |
| | B-4 | | | | | (API spec.) | (API spec.) | | (API spec.) |
| | C-1 | | | 5 | | | | Mn | |
| | C-2 | | | | | | | steel | |
| | C-3 | | | | 3 | | | | |
| | D-1 | | | | | | | | |
| | D-2 | | 2 | | | With grease supplemental application | No grease supplemental application | No grease supplemental application | With grease supplemental application |
| | D-3 | | | | 2 | | | | |
| | E-1 | | | | | | | | |
| | E-2 | | 30 | | 25 | | | | |
| | E-3 | 10 | 10 | | | | | | |
| | E-4 | | 8 | | 10 | | | | |
| | E-5 | 40 | | 75 | 20 | | | | |
| Base number | | 50 | <1 | 80 | <1 | — | — | — | — |
| Viscosity[1] | | 348 | 3.8 | 523 | 134 | — | — | — | — |
| Thickness[2] | | 350 | 25 | 450 | 120 | 850 | 850 | 30 | 850 |
| Surface roughness (Rmax, μm) of convex test piece | F-1 | 3 | | 3 | | 3 | 3 | 3 | 3 |
| | F-2 | | | | | | | | |
| | F-3 | | | | | | | | |
| | F-4 | | 10 | | 10 | | | | |
| | F-5 | | | | | | | | |
| | F-6 | | | | | | | | |
| Surface roughness (Rmax, μm) of concave test piece | F-1 | | 3 | | | | | | |
| | F-2 | 20 | | | | | | | |
| | F-3 | | | | | | | | 22 |
| | F-4 | | | | | | | | |
| | F-5 | | 20 | | 20 | 25 | 25 | 20 | |
| | F-6 | | | | | | | | |

TABLE 7-continued

|  | Mark | Comparative Example No. (Mn steel joint) | | | | Conventional Example No. | | | |
| --- | --- | --- | --- | --- | --- | --- | --- | --- | --- |
|  |  | 1 | 2 | 3 | 4 | 1 | 2 | 3 | 4 |
| Lubricity A[3] |  | 8 | 4 | 9 | 7 | 15 | 8 | 10 | 14 |
| Lubricity B[4] |  | 6 | 3 | 7 | 5 | 11 | 5 | 5 | 10 |
| Rust prevention |  | Δ | X | ○ | Δ | ○ | —* | Δ | ○ |

(Notes)
[1]Viscosity at 40° C. (cSt or mm$^2$/s);
[2]Thickness of coating ($\mu$m);
[3]Load carrying capacity in normal test (×100 kgf);
[4]Load carrying capacity in the presence of scale flakes (×100 kgf).
*Not determined As shown by the Conventional Examples in Table 7, in the case of grease lubrication, if supplemental application of grease was carefully carried out as in Conventional Examples 1 and 4, lubricity and rust preventing properties were both good, and lubricity was guaranteed to such a degree that fastening of a threaded joint for oil well pipes could be carried out without the occurrence of galling even in the presence of scale flakes. However, in Conventional Example 2 in which supplemental application of grease was not carried out, the lubricity greatly decreased, and it became easy for galling to occur, particularly in the presence of scale flakes. Thus, with grease lubrication, troublesome supplemental application of grease was necessary in order to maintain lubricity.

In Conventional Example 3 in Table 7, a solid lubricant-resin coating was evaluated without supplemental application of a grease, as was the case for the Examples and the Comparative Examples. As can be seen from the test results, the lubricity was barely acceptable under normal conditions when tested in the absence of scale flakes, but was significantly deteriorated when tested in the presence of scale flakes. Therefore, the coating could not impart sufficient lubricity to allow actual use on a threaded joint for oil well pipes. In addition, it had inadequate rust preventing properties. Thus, it is apparent that a non-extensible solid lubricant-resin coating has deteriorated rust preventing properties once it is damaged and a deteriorated lubricity once rust or scale flakes are deposited thereon.

In contrast, as can be seen from Tables 5 and 6 showing Examples in which a lubricating coating was formed from a composition according to the present invention and tested without grease lubrication, excellent lubricity and rust preventing properties were obtained with the inventive composition to the same level as conventional grease lubrication with supplemental grease application (Conventional Examples 1, 4). Thus, even in the presence of scale flakes, resistance to galling could be guaranteed with a threaded joint for oil well pipes made not only of carbon steel but of stainless steel, which is more susceptible to galling, without application and supplement of a grease.

Each of the lubricating coating composition prepared in the Examples was applied to an actual threaded joint for oil well pipes and subjected to repeated fastening and releasing ten times. The make-up torque was stable with a variation of at most ±10 percent.

Industrial Applicability

In accordance with the present invention, it is possible to impart excellent lubricity and rust preventing properties to a threaded joint for oil well pipes of the same level as can be achieved by grease lubrication with supplemental grease application. Thus, adequate lubricity and rust preventing properties can be guaranteed without grease lubrication even under conditions in which there are problems in assembly or adhesion or deposition of blasting particles or scale or rust flakes. As a result, the operating efficiency in connecting oil well pipes using the joint can be significantly improved while avoiding pollution by the use of a heavy metal-containing compound grease.

It will be appreciated by those skilled in the art that numerous variations and modifications may be made to the invention as described above with respect to specific embodiments without departing from the scope of the invention.

What is claimed is:

1. A threaded joint for metal pipes comprising a pin and a box capable of mating with each other, the pin having an externally threaded portion and an unthreaded metal contact portion, and the box having an internally threaded portion and an unthreaded metal contact portion, wherein at least one of the pin and the box has a lubricating coating formed on at least part of the threaded portion and/or unthreaded metal contact portion, the lubricating coating comprising at least 10 wt % of at least one basic lubricant selected from a basic sulfonate, a basic salicylate, and a basic phenate, wherein the at least one basic lubricant has a base number of at least 50 mg KOH/g, wherein the lubricating coating further comprises a thermoplastic resin.

2. A threaded joint according to claim 1 wherein the thermoplastic resin is in powder form.

3. A threaded joint according to claim 2 wherein the metal pipe is an oil well pipe.

4. A threaded joint according to claim 2 wherein the surface of the portion on which the lubricating coating is formed has a surface roughness, Rmax, in the range of 5–40 micrometers.

5. A threaded joint according to claim 1 wherein the metal pipe is an oil well pipe.

6. A threaded joint according to claim 1 wherein the lubricating coating further comprises at least one additive selected from a lubricant other than the basic lubricant and an extreme pressure agent.

7. A threaded joint according to claim 6 wherein the surface of the portion on which the lubricating coating is formed has a surface roughness, Rmax, in the range of 5–40 micrometers.

8. A threaded joint according to claim 6 wherein the metal pipe is an oil well pipe.

9. A threaded joint according to claim 1 wherein the surface of the portion on which the lubricating coating is formed has a surface roughness, Rmax, in the range of 5–40 micrometers.

10. A threaded joint for metal pipes comprising a pin and a box capable of mating with each other, the pin having an externally threaded portion and an unthreaded metal contact portion, and the box having an internally threaded portion and an unthreaded metal contact portion, wherein at least one of the pin and the box has a lubricating coating formed on at least part of the threaded portion and/or unthreaded metal contact portion, the lubricating coating comprising at least 10 wt % of at least one basic lubricant selected from a basic sulfonate, a basic salicylate, and a basic phenate, wherein the at least one basic lubricant has a base number of at least 50 mg KOH/g, wherein the surface of the portion on which the lubricating coating is formed has a surface roughness, Rmax, in the range of 5–40 micrometers.

11. A threaded joint for metal pipes comprising a pin and a box capable of mating with each other, the pin having an externally threaded portion and an unthreaded metal contact portion, and the box having an internally threaded portion and an unthreaded metal contact portion, wherein at least one of the pin and the box has a lubricating coating formed on at least part of the threaded portion and/or unthreaded metal contact portion, the lubricating coating being formed by application of a lubricating coating composition followed by drying, wherein the lubricating coating composition comprises a volatile organic solvent, and at least one basic lubricant selected from a basic sulfonate, a basic salicylate, and a basic phenate which is at least partially dissolved in the solvent, wherein the surface of the portion on which the lubricating coating is formed has a surface roughness, Rmax, in the range of 5–40 micrometers.

12. A threaded joint for metal pipes comprising a pin and a box capable of mating with each other, the pin having an externally threaded portion and an unthreaded metal contact portion, and the box having an internally threaded portion and an unthreaded metal contact portion, wherein at least one of the pin and the box has a lubricating coating formed on at least part of the threaded portion and/or unthreaded metal contact portion, the lubricating coating comprising at least 10 wt % of at least one basic lubricant selected from a basic sulfonate, a basic salicylate, and a basic phenate, wherein the at least one basic lubricant has a base number of at least 50 mg KOH/g, wherein the lubricating coating further comprises at least one additive selected from a lubricant other than the basic lubricant and an extreme pressure agent, wherein the surface of the portion on which the lubricating coating is formed has a surface roughness, Rmax, in the range of 5–40 micrometers.

13. A threaded joint for metal pipes comprising a pin and a box capable of mating with each other, the pin having an externally threaded portion and an unthreaded metal contact portion, and the box having an internally threaded portion and an unthreaded metal contact portion, wherein at least one of the pin and the box has a lubricating coatina formed on at least part of the threaded portion and/or unthreaded metal contact portion, the lubricating coating comprising at least 10 wt % of at least one basic lubricant selected from a basic alkaline earth metal sulfonate, a basic alkaline earth metal salicylate, and a basic alkaline earth metal phenate, wherein the surface of the portion on which the lubricating coating is formed has a surface roughness, Rmax, in the range of 5–40 micrometers.

14. A threaded joint for metal pipes comprising a pin and a box capable of mating with each other, the pin having an externally threaded portion and an unthreaded metal contact portion, and the box having an internally threaded portion and an unthreaded metal contact portion, wherein at least one of the pin and the box has a lubricating coating formed on at least part of the threaded portion and/or unthreaded metal contact portion, the lubricating coating comprising at least 10 wt % of at least one basic lubricant selected from a basic alkaline earth metal sulfonate, a basic alkaline earth metal salicylate, and a basic alkaline earth metal phenate, wherein the lubricating coating further comprises a thermoplastic resin, wherein the surface of the portion on which the lubricating coating is formed has a surface roughness, Rmax, in the range of 5–40 micrometers.

15. A threaded joint for metal pipes comprising a pin and a box capable of mating with each other, the pin having an externally threaded portion and an unthreaded metal contact portion, and the box having an internally threaded portion and an unthreaded metal contact portion, wherein at least one of the pin and the box has a lubricating coating formed on at least part of the threaded portion and/or unthreaded metal contact portion, the lubricating coating comprising at least 10 wt % of at least one basic lubricant selected from a basic alkaline earth metal sulfonate, a basic alkaline earth metal salicylate, and a basic alkaline earth metal phenate, wherein the lubricating coating further comprises a thermoplastic resin, wherein the thermoplastic resin is in powder form, wherein the surface of the portion on which the lubricating coating is formed has a surface roughness, Rmax, in the range of 5–40 micrometers.

16. A threaded joint for metal pipes comprising a pin and a box capable of mating with each other, the pin havinG an externally threaded portion and an unthreaded metal contact portion, and the box having an internally threaded portion and an unthreaded metal contact portion, wherein at least one of the pin and the box has a lubricating coating formed on at least part of the threaded portion and/or unthreaded metal contact portion, the lubricating coating comprising at least 10 wt % of at least one basic lubricant selected from a basic alkaline earth metal sulfonate, a basic alkaline earth metal salicylate, and a basic alkaline earth metal phenate, wherein the lubricating coating further comprises at least one additive selected from a lubricant other than the basic lubricant and an extreme pressure agent, wherein the surface of the portion on which the lubricating coating is formed has a surface roughness, Rmax, in the range of 5–40 micrometers.

17. A threaded joint for metal pipes comprising a pin and a box capable of mating with each other, the pin having an externally threaded portion and an unthreaded metal contact portion, and the box having an internally threaded portion and an unthreaded metal contact portion, wherein at least one of the pin and the box has a lubricating coating formed on at least part of the threaded portion and/or unthreaded metal contact portion, the lubricating coating comprising at least 10 wt % of at least one basic lubricant selected from a basic alkaline earth metal sulfonate, a basic alkaline earth metal salicylate, and a basic alkaline earth metal phenate, wherein the lubricating coating further comprises a thermoplastic resin, wherein the lubricating coating further comprises at least one additive selected from a lubricant other than the basic lubricant and an extreme pressure agent, wherein the surface of the portion on which the lubricating coating is formed has a surface roughness, Rmax, in the range of 5–40 micrometers.

* * * * *